United States Patent
McFarland

(10) Patent No.: US 7,835,711 B2
(45) Date of Patent: Nov. 16, 2010

(54) METHOD AND APPARATUS FOR A SIGNAL SELECTIVE RF TRANSCEIVER SYSTEM

(75) Inventor: William J. McFarland, Los Altos, CA (US)

(73) Assignee: Atheros Communications, Inc., San Jose, CA (US)

( * ) Notice: Subject to any disclaimer, the term of this patent is extended or adjusted under 35 U.S.C. 154(b) by 699 days.

(21) Appl. No.: 11/764,774

(22) Filed: Jun. 18, 2007

(65) Prior Publication Data

US 2007/0238425 A1 Oct. 11, 2007

Related U.S. Application Data

(62) Division of application No. 10/621,687, filed on Jul. 17, 2003, now Pat. No. 7,245,882.

(51) Int. Cl.
H04B 7/08 (2006.01)
H04B 1/10 (2006.01)
H04M 1/00 (2006.01)

(52) U.S. Cl. ........................ 455/130; 455/132; 455/307; 455/553.1

(58) Field of Classification Search ......... 455/132–140, 455/168.1, 179.1–180.2, 188.1–188.2, 303–307, 455/552.1, 553.1, 558
See application file for complete search history.

(56) References Cited

U.S. PATENT DOCUMENTS

| | | | | |
|---|---|---|---|---|
| 4,970,479 A | * | 11/1990 | Landt et al. | ................ 333/101 |
| 5,630,223 A | * | 5/1997 | Bahu et al. | ................... 455/296 |
| 5,729,829 A | * | 3/1998 | Talwar et al. | .............. 455/63.1 |
| 5,815,804 A | | 9/1998 | Newell et al. | |
| 6,131,022 A | | 10/2000 | Jacomb-Hood et al. | |
| 6,151,354 A | | 11/2000 | Abbey | |
| 6,215,988 B1 | | 4/2001 | Matero | |
| 6,332,083 B1 | | 12/2001 | Shi et al. | |
| 6,370,360 B1 | | 4/2002 | Kunkel | |
| 6,415,001 B1 | | 7/2002 | Li et al. | |
| 6,466,768 B1 | | 10/2002 | Agahi-Kesheh et al. | |
| 6,614,811 B1 | * | 9/2003 | Alaimo et al. | .............. 370/498 |
| 6,714,765 B1 | | 3/2004 | Kimppa | |
| 6,728,517 B2 | | 4/2004 | Sugar et al. | |
| 6,745,018 B1 | * | 6/2004 | Zehavi et al. | ............... 455/296 |
| 6,751,470 B1 | * | 6/2004 | Ella et al. | ................ 455/552.1 |
| 6,861,924 B2 | * | 3/2005 | Machui | ...................... 333/133 |
| 6,912,406 B2 | | 6/2005 | Lahium et al. | |
| 6,961,596 B2 | * | 11/2005 | Van Erven | ............... 455/575.1 |
| 6,970,681 B2 | | 11/2005 | Darabi et al. | |
| 6,985,701 B2 | | 1/2006 | Yoshida et al. | |
| 7,057,472 B2 | | 6/2006 | Fukamachi et al. | |
| 7,376,440 B2 | * | 5/2008 | Forrester et al. | ......... 455/553.1 |
| 2001/0049271 A1 | | 12/2001 | Hirtzlin et al. | |

(Continued)

Primary Examiner—Simon D Nguyen
(74) Attorney, Agent, or Firm—Bever, Hoffman & Harms, LLP; Jeanette S. Harms

(57) ABSTRACT

Method and apparatus to dynamically configure the signal reception selectivity of a plurality of transceivers is described. In one embodiment, a transceiver includes a receiver circuit having two or more filter circuits. Each of the filter circuits is configured to pass RF signals from a different portion of an overall receiver bandwidth. When two or more receivers in proximity to one another are simultaneously operating, the filter circuits of the respective receiver are dynamically configured to different RF frequency passbands to minimize interference and cross talk between receivers and transmitters.

10 Claims, 6 Drawing Sheets

Antenna/filter module for case when number of sub-bands desired is greater than the number of radio cards

U.S. PATENT DOCUMENTS

| | | |
|---|---|---|
| 2002/0037742 A1 | 3/2002 | Enderlein et al. |
| 2002/0090974 A1* | 7/2002 | Hagn ........................ 455/552 |
| 2002/0183016 A1* | 12/2002 | Kemmochi et al. ........... 455/83 |
| 2004/0017794 A1* | 1/2004 | Trachewsky ................ 370/338 |
| 2004/0029548 A1 | 2/2004 | Li |
| 2005/0048927 A1* | 3/2005 | Kemmochi et al. ........... 455/78 |
| 2005/0239499 A1 | 10/2005 | Oosawa et al. |

* cited by examiner

Antenna/filter module for case when number of sub-bands desired equal number of radio cards Antenna/filter module for case when number of sub-bands desired is greater than the number of radio cards

US 7,835,711 B2

METHOD AND APPARATUS FOR A SIGNAL SELECTIVE RF TRANSCEIVER SYSTEM

RELATED APPLICATIONS

This application is a divisional of U.S. patent application Ser. No. 10/621,687, entitled "Method And Apparatus For A Signal Selective RF Transceiver System" filed Jul. 17, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

Embodiments of the present invention generally relate to wireless devices and more specifically to receiving and transmitting signals between transceivers.

2. Description of the Related Art

Generally, a communication system includes a transmitter and receiver which transmit and receive information signals over a transmission media such as wires or atmosphere. When atmosphere is used, the transmission is commonly referred to as "wireless communication". Examples of various types of wireless communication systems include digital cellular, packet data paging, wireless local area networks (LAN), wireless wide area networks (WAN), personal communication systems, and others.

One problematic issue relates to increasing wireless network capacity. As more users are added to a wireless network, the more information each wireless network transceiver (card) is required to handle. Others have attempted to solve this issue by using a plurality of wireless network cards to increase wireless system capacity. To minimize floor space usage, often the plurality of wireless network cards are placed in a "rack" system, often in close proximity to one another. This methodology also allows the sharing of electrical power and communication busses between the various wireless network cards for common control thereof. Unfortunately, transmitters and receivers of the wireless network cards placed in proximity to one another can cause cross talk and interference issues. For example, consider the case of co-located devices where a transmitter A is positioned in proximity to a receiver B, and transmitter A and receiver B are operating at approximately the same radio frequency (RF). Due to the spatial proximity between transmitter A to receiver B, when transmitter A is transmitting a RF signal to another receiver C, the output power of transmitter A may overload the input of receiver B, especially if receiver B has increased its input sensitivity to receive a weak signal from a distant transmitter (D).

As just described, this problem is particularly serious when one wireless network card is transmitting while another is receiving. Some wireless networking systems employ protocols that can be configured to avoid this situation. For example, Time Division Multiple Access (TDMA) systems allow the base station to control when each device transmits or receives. In this way, co-located devices could be scheduled such that one does not transmit while the other is receiving. Code Division Multiple Access (CDMA) systems have coding gain. By assigning different codes to the co-located devices, the damage that occurs when one transmits while another is receiving can be minimized. Finally, some wireless communication systems are based on polling, which like TDMA allows the transmissions of each device to be controlled by a centralized controller which transmits the polls allowing individual devices to transmit. By proper timing of the polling, the case of one co-located device transmitting while another is receiving can be avoided.

Others have tried to correct the problem of uncoordinated transmission times, where a co-located device transmits while another receives, by using wireless network cards having narrow RF filters that limit each card to specific frequencies of operation. Unfortunately, this methodology may require procuring and maintaining a stock of different wireless network cards for each narrow frequency sub-range. Still others have tried to use spatially separated antennas or used directional antenna systems. Some have used time sharing solutions where only one wireless card is allowed to communicate at a time. All of the above solutions generally add complexity, reduce flexibility or performance, and increase the overall cost of the wireless network.

SUMMARY OF THE INVENTION

The present inventors have realized the need to configure a plurality of adjacent wireless network circuits to operate simultaneously without reducing communication system efficiency and increasing cost and complexity. An aspect of the present invention is a radio frequency (RF) receiver including a RF filter circuit configured to dynamically select an available frequency range from a plurality of frequency ranges, and a RF processing circuit configured to signal process a RF signal passed through the RF filter circuit.

An aspect of the present invention is a RF wireless network that includes at least two RF transceiver circuits. Each of the at least two RF transceiver circuits being configured to select between a plurality of frequency channels. The wireless network system also includes a processor configured to determine different available frequency channels from the plurality of frequency channels for each of the at least two RF transceiver circuits.

An aspect of the present invention is a method for selecting a RF signal reception frequency range. Available RF frequency ranges are determined from a plurality of RF frequency ranges. One receiver is configured to receive one of the available RF frequency ranges. Another receiver is configured to receive another of the available RF frequency ranges.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

It is to be noted, however, that the appended drawings illustrate only typical embodiments of this invention and are therefore not to be considered limiting of its scope, for the present invention may admit to other equally effective embodiments.

DETAILED DESCRIPTION OF THE PREFERRED EMBODIMENT

In the following description, numerous specific details are set forth to provide a more thorough understanding of the present invention. However, upon review of the present disclosure, it will be apparent to one of ordinary skill in the art that the present invention may be practiced without one or more of these specific details. In other instances, well-known features have not been described in order to avoid obscuring the present invention. Aspects of the present invention are described in terms of wireless RF transmission and reception in an IEEE 802.11a and IEEE 802.11b regulated environment; however, other wireless transmission and reception environments are contemplated.

Figure 1:
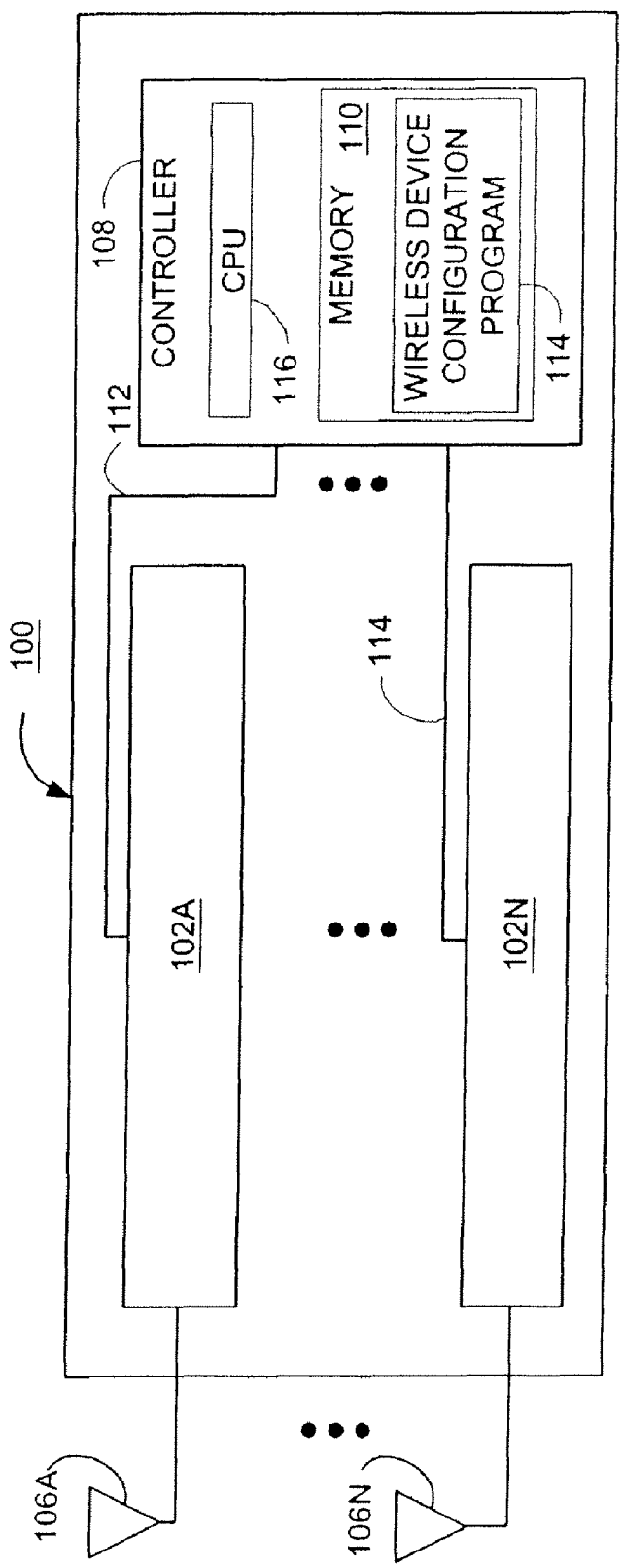
FIG. 1 is a high-level schematic diagram illustrating one embodiment of an exemplar wireless network system in accordance with one or more aspects of the present invention.

FIG. 1 is a high-level schematic diagram illustrating one embodiment of an exemplar wireless network system 100 in accordance with one or more aspects of the present invention. In general, wireless network system 100 may operate within a wireless local area network (LAN), a wireless wide area network (WAN), and the like. In a particular embodiment, the wireless network is connected to larger networks such as the Internet. In one aspect, wireless network system 100 includes a plurality of wireless network circuits 102A-N, where N represents an "Nth" number of wireless network circuits 102A-N. Wireless network circuits 102A-N include wireless network devices such as wireless adapters, wireless network interface cards (NIC), and the like. Wireless network circuits 102A-N may communicate with one or more other wireless devices disposed internal and external to the wireless network system 100. Wireless network circuits 102A-N will be described further with respect to FIGS. 2 and 3.

Wireless network system 100 includes one or more antennas 106A-N where N represents an "Nth" number of antennas 106A-N. Each antenna 106A-N is coupled to a respective wireless network circuit 102A-N. Antennas 106A-N are configured to receive and transmit signals to and from the wireless network circuits 102A-N as known in the art. Other more advanced multiple antenna techniques may also be utilized.

Wireless network system 100 also includes controller 108. Controller 108 is configured to dynamically configure wireless network circuits 102 to different operational frequency channels relative one another via, for example, control signals 112 and 114, respectively, described below. Controller 108 includes Central Processing Unit (CPU) 116 and a memory 110. The CPU 116 may be under the control of an operating system that may be disposed in the memory 110. Illustrative operating systems, which may be used to advantage, include Linux and Microsoft's Windows®. More generally, any operating system supporting the configuration functions disclosed herein may be used. The memory 110 is preferably a random access memory sufficiently large to hold the necessary programming and data structures of the invention. While the memory 110 is shown as a single entity, it should be understood that the memory 110 may in fact comprise a plurality of modules, and that the memory 110 may exist at multiple levels, from high speed registers and caches to lower speed but larger direct random access memory (DRAM) chips.

Illustratively, the memory 110 may include a wireless device configuration program 114 that, when executed on CPU 116, configures wireless network circuits 102A-N to different frequency channels of operation. The wireless device configuration program 114 may use any one of a number of different programming languages. For example, the program code can be written in PLC code (e.g., ladder logic), a higher level language such as C, C++, Java, or a number of other languages. While the wireless device configuration program 114 may be a standalone program, it is contemplated that wireless device configuration program 114 may be combined with other programs. For example, the wireless device configuration program 114 may be combined with other wireless device programs configured to allocate channel usage between other wireless networks.

In one embodiment, wireless device configuration program 114 configures wireless network circuits 102A-N to operate on different frequency channels or frequency sub-channels relative one another. For purposes of clarity, frequency channels and frequency sub-channels will be described herein as frequency channels. Wireless device configuration program 114 may configure wireless network circuits 102A-N to operate on different frequency channels relative to other external wireless systems in proximity thereto. A channel is defined herein as any frequency, or range of frequencies, that are spaced separately in frequency. For example, consider the case of a RF signal having an operational range of 2.4 GHz to 2.48 GHz. For a 10 MHz channel bandwidth, such RF signal may have, for example, up to 8 frequency channels depending on the frequency spacing and guard-band between the frequency channels.

Figure 2:
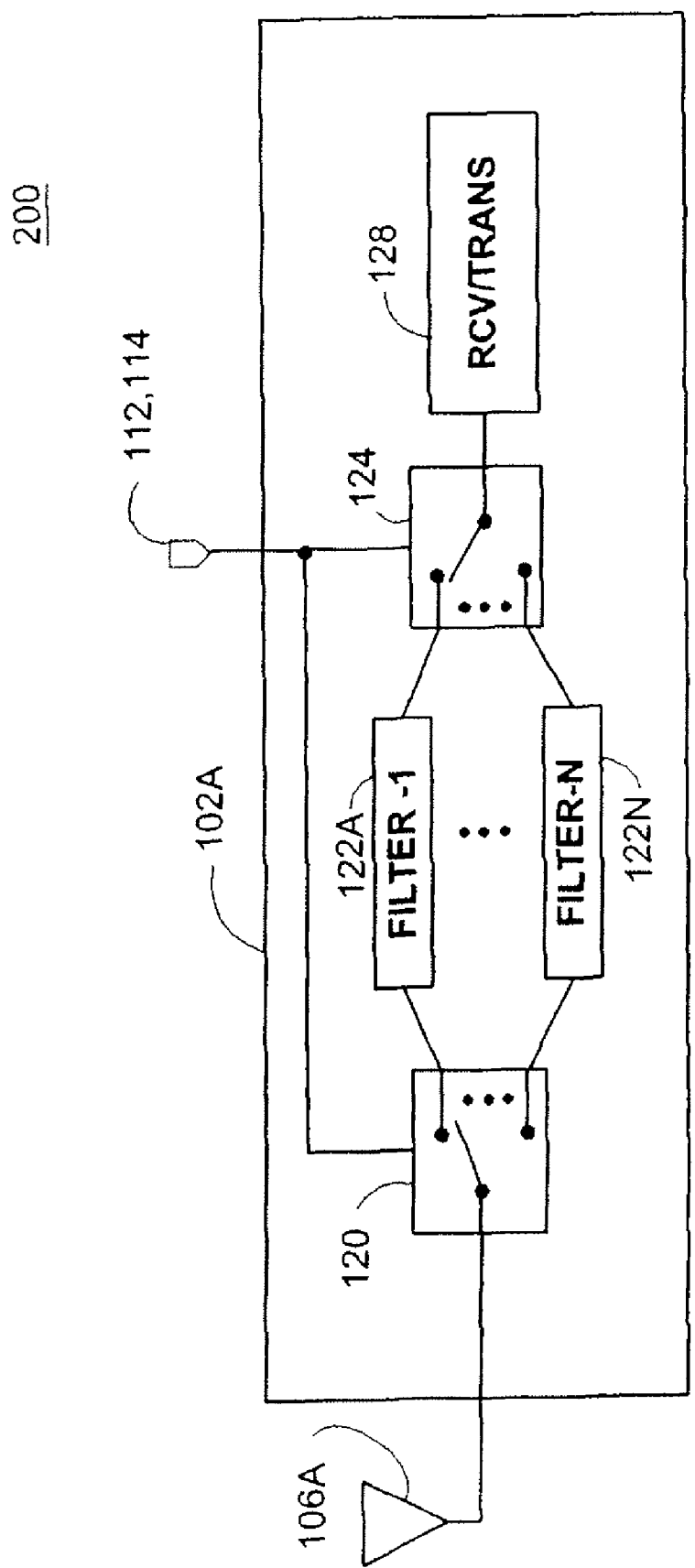
FIG. 2 is a high-level schematic diagram illustrating one embodiment of a receiver of the wireless network system of FIG. 1 in accordance with one or more aspects of the present invention.

FIG. 2 is a high-level schematic diagram illustrating one embodiment of a wireless network circuit 102A of the RF transceiver of FIG. 1 in accordance with one or more aspects of the present invention. For purposes of clarity, wireless network circuit 102A will be described in terms of receiving a signal from antenna 106A; however, in various embodiments, wireless network circuit 102A is used to couple a RF signal to antenna 106A for transmission therefrom. In one embodiment, multiple antennas are connected to wireless network circuit 102A in parallel or through a switching device.

In general, wireless network circuit 102A includes switch circuit 120, a plurality of RF filter circuits 122A-N, switch circuit 124, and transceiver 128. Switch circuit 120 includes an input electrically connected to antenna 106A. Switch circuit 120 includes multiple outputs, where one output is coupled to an input of a respective one of a plurality of RF filter circuits 122A-N, where N represents an "Nth" filter circuit 122A-N. Each RE filter circuit 122A-N includes an output connected to a respective input of switch 124. Switch 124 is configured to connect an output of one of the RF filter circuits 122A-N to an input of transceiver 128. Switch circuits 120 and 124 may be selected from a plurality of switches configured to pass RF signals such as PIN diode switches, GaAs FET switches, coaxial switches, and the like. Each RF filter circuit 122A-N is configured to have a different frequency passband relative to the other RF filter circuits 122A-N. In one configuration, each RF filter circuit 122A-N is configured to have a frequency passband correlating to a respective frequency channel. For example, given a wireless network system 100 having ten frequency channels and ten RF filter circuits 122A-N, each of the ten RF filter circuits 122A-N may be configured with a frequency passband correlating to one of the ten frequency channels. However, to reduce the cost and size of the solution, it may be advantageous to use fewer filters. For example, only two filters might be used. In that case, each filter would have a passband wide enough to allow 5 different frequency channels to pass through the filter. Control signals 112 and 114 may be used to set switch 120 and switch 124 so that one of a RF filter circuits 122A-N is coupled to antenna 106A and to transceiver 128. In one aspect, controller 118 is configured to set control signals 112 and 114 responsive to an analog signal wherein changes to such an analog signal cause the control signals to set switch positions of switch 120 and switch 124. In another aspect, control signals 112 and 114 are coupled to and responsive to digital signals from controller 108 wherein changes to such digital signals result in changes of switch positions of switch 120 and switch 124.

It is generally more difficult and expensive to build filters with very abrupt transitions from a pass band to a stop band. Therefore, in the case of a contiguous set of channels, it may be more efficient to allow overlapping between the filter passbands. Consider options 3A, 3B, and 3C illustrated in FIG. 3. In cases that the filter passbands overlap (e.g., options 3A and 3B), the frequencies within the overlap are used only if there is sufficient distance between the transceivers to prevent overloading without the benefit of filtering. In more favorable circumstances, there may be a natural gap in the allocated frequencies for a particular application.

For example, the FCC currently allocates the band 5.15-5.35 GHz as well as the band 5.725-5.825 GHz to wireless LANs. In this case, it is natural to put one filter passband from 5.15-5.35 GHz, and another filter passband from 5.725-5.825 GHz. In this case, the transition region of the filters occur between 5.35 and 5.725 GHz, in which neither transceiver is allowed to operate due to government regulations. This allows all available channels in one of the bands to be used by a first transceiver without overloading a second transceiver operating in the other band, even if the two transceivers are located physically near to each other.

Figure 3:
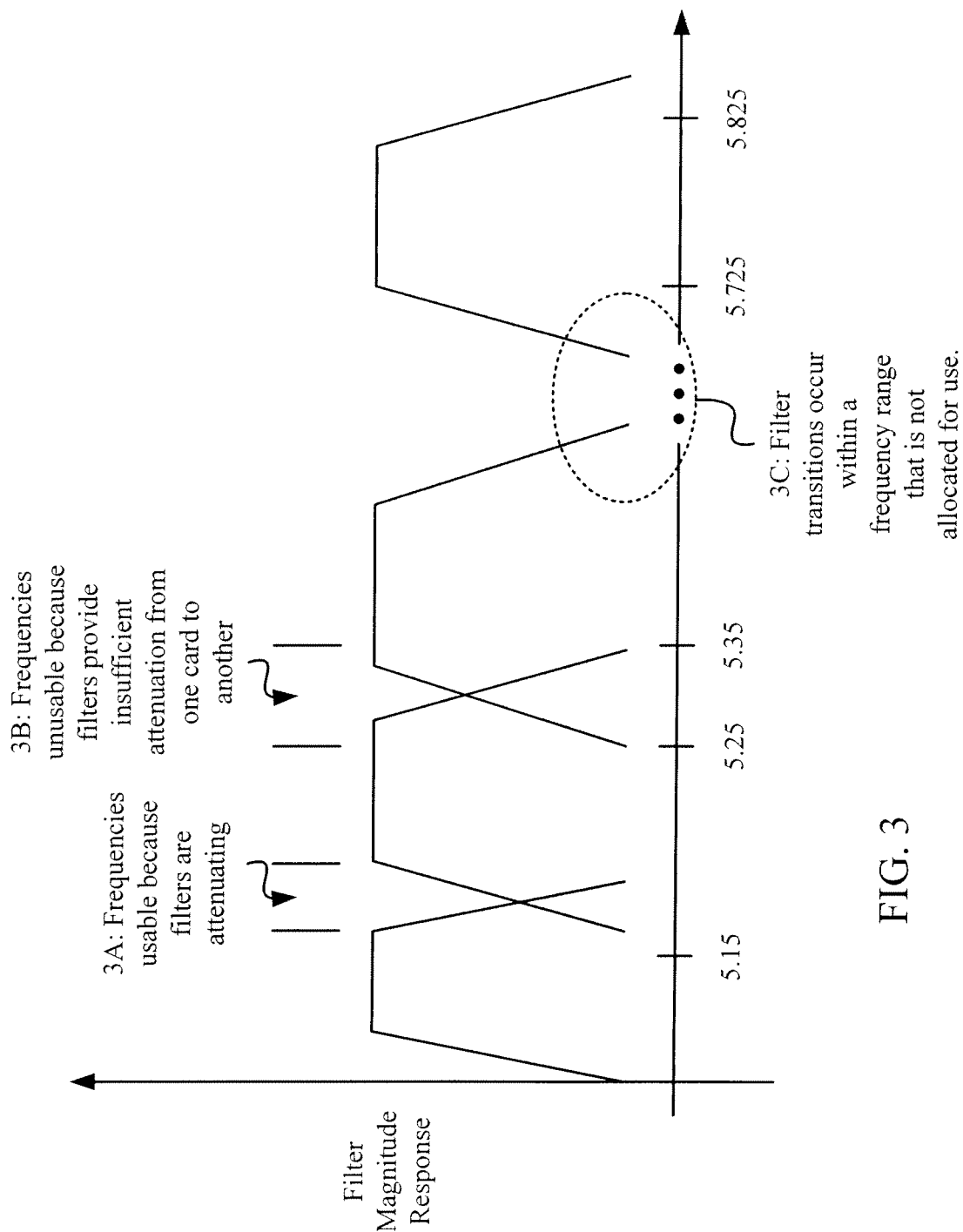
FIG. 3 is a diagram showing possible arrangements of filter pass bands and transition bands relative to frequency allocations.

Again, FIG. 3 shows these options. Option 3A illustrates a case where frequencies in a filter transition region are usable, due to either sufficient filtering at the transition region and/or sufficient distance between transceivers. Option 3B illustrates the opposite case where there is either insufficient filtering and/or the transceivers are in too close of a proximity to each other. Option 3B illustrates a transition region that occurs in an unallocated frequency range.

Control signal 112, 114 may be used to set switch 120 and switch 124 so that one of a RF filter circuit 122A-N is coupled to antenna 106A and to transceiver 128. In one aspect, control signal 112, 114 may be configured responsive to an analog signal wherein changes to such an analog signal result in changes of switch positions of switch 120 and switch 124. In another aspect, control signal 112, 114 is coupled to and responsive to digital signals from controller 108 wherein changes to such digital signals result in changes of switch positions of switch 120 and switch 124.

In practice, it may be desirable to implement the RF filters in a separate module that can be connected to a standard card that can cover the full range of available frequencies. The standard cards are the type of cards used at the mobile clients where more than one radio card are not generally employed (e.g., PCMCIA, Cardbus, or mini-PCI cards). The separate module implementing the RF filters is configured with, for example, a connector that fits a corresponding connector on the card.

In addition, inexpensive base stations or access points may also primarily be constructed with a single radio that can tune over all the available channels. In this case, if the filters are constructed in a separate module, the separate module may have a connector interface that mates to a corresponding connector on the base station or access point.

Figure 4A:
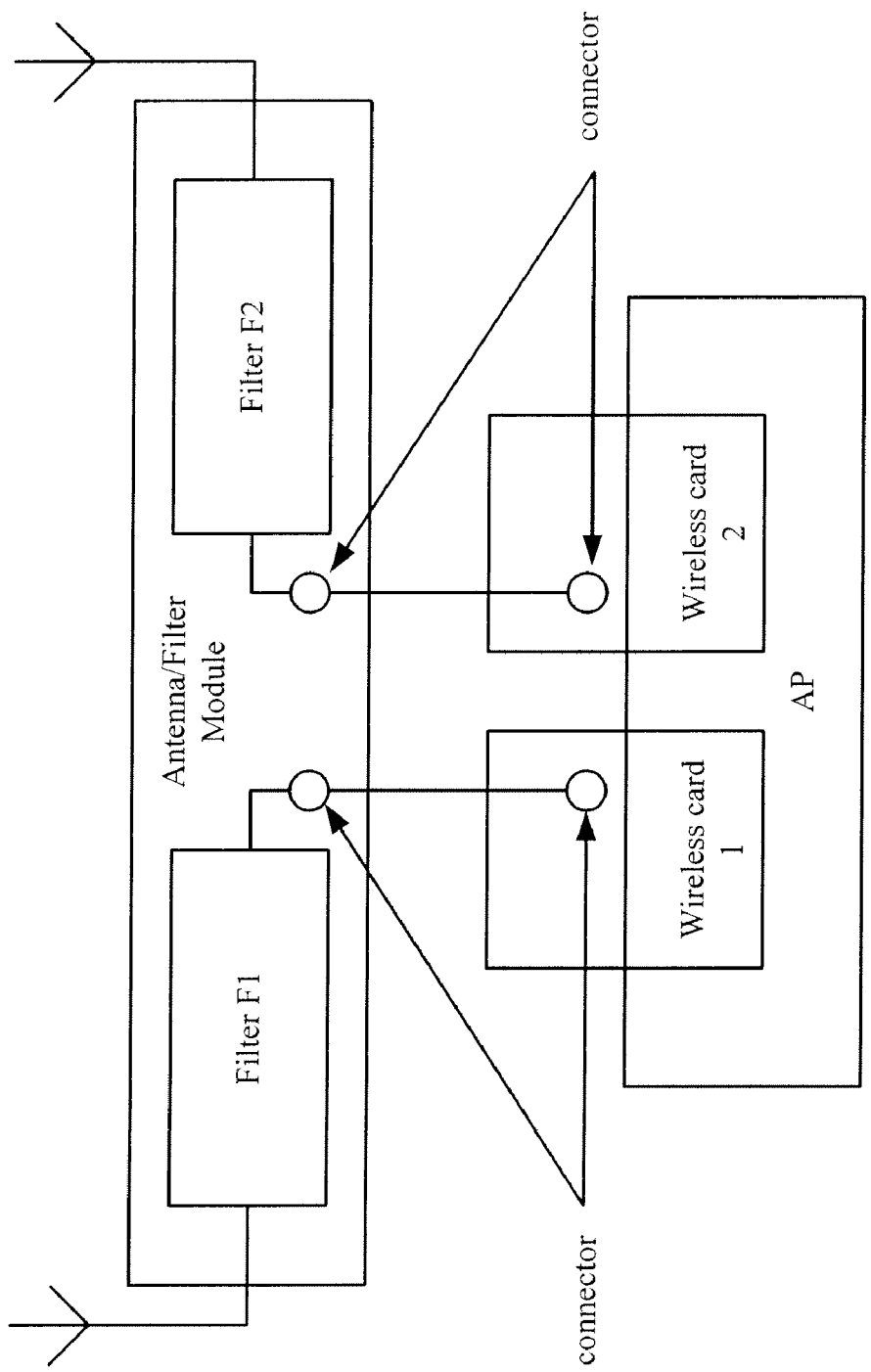
FIG. 4A is a diagram of an antenna module according to an embodiment of the present invention that can be attached to one or more cards in a system.
Figure 4B:
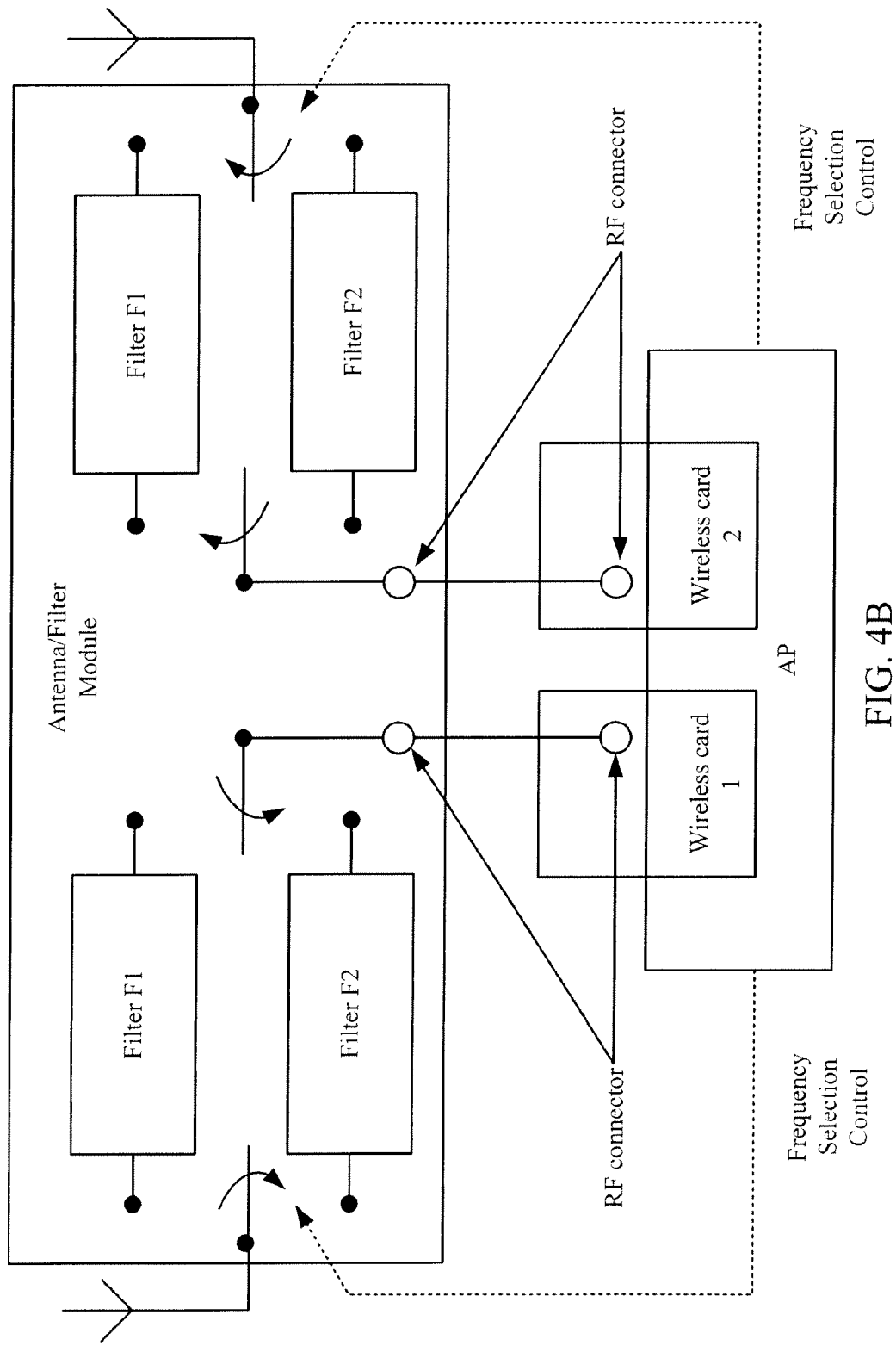
FIG. 4B is a diagram of an antenna module according to an embodiment of the present invention illustrating an example placement of the filters, switches, and antennas that can be attached to, for example, a generic wireless network card.

FIG. 4A shows a way in which standard cards can be coupled to a separate module. In one embodiment, the module includes just the additional sub-band RF filters. In another embodiment, the module includes the filters and antennas. When antennas are included in the module, the antennas may be mounted, for example, at some distance, or in specific orientations such that the coupling between antennas is reduced (e.g., at opposite ends of the module). This will in turn reduce the requirements on the filters in order to prevent overloading of the receive filters.

In the case that the number of frequency sub-bands is equal to the number of radio cards, a single filter module can be attached to each radio card. This is sufficient for the cases in which the only strong interference concerns come from the radio cards present within the single Access Point (AP). This is shown in FIG. 4a. In the case that more frequency sub-bands are desired, multiple filters, together with switches to select the appropriate filter are included in the module. A module containing enough sets of filters and switches for each wireless card is then attached to the wireless cards. Alternatively, a single card with a set of the described filters and switches is attached to each radio card. These arrangements are beneficial if strong signals that could cause receiver overloading are expected from sources that are not within the AP itself.

Such assemblies (e.g., single filter modules or modules with multiple filters and selection switches) can be sold as an aftermarket addition or kit. In that case, the base station could be sold with a single radio card originally. In the case that more communications capacity is desired, a second radio card can be obtained, along with the filter/antenna assembly. By inserting the second radio card into an empty slot in the base station and attaching the filter/antenna assembly, two radio channels can operate simultaneously without overloading the receivers, thereby doubling the capacity of the base station.

Figure 5:
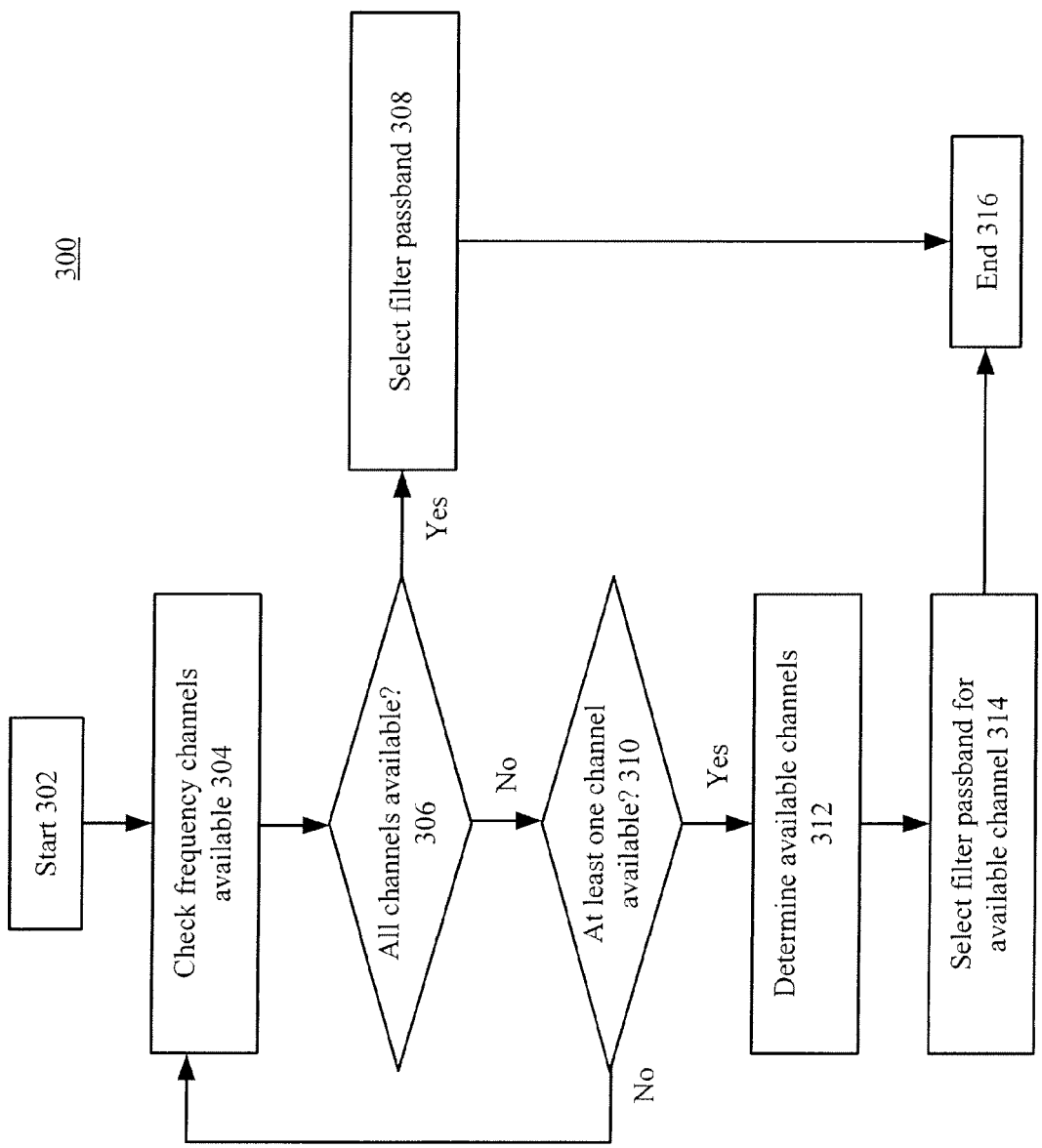
FIG. 5 is flow diagram of one embodiment of a method for dynamically configuring a plurality of wireless network circuits in accordance with one or more aspects of the present invention.

FIG. 5 is flow diagram of one embodiment of a method 300 for dynamically configuring a plurality of wireless network circuits 102A-N in accordance with one or more aspects of the present invention. Method 300 starts at 302 when, for example, wireless device configuration program 114 is activated. At 304, frequency channel availability is determined. In one aspect, the frequency channel availability is determined by checking the frequency channel of operation of one or more other wireless network circuits 102A-N of wireless network system 100. For example, if one of the wireless network circuits 102A-N were configured for channel one, method 300 may configure another of the wireless network circuits 102A-N to channel two, and so forth. In another aspect of the invention, method 300 may utilize a lookup table stored in memory 110 that establishes the frequency range of operation for each wireless network circuits 102A-N. For example, the table may specify that one of the wireless network circuit 102A-N be configured to channel one, while another of the wireless network circuits 102A-N is configured to channel two, and so forth. While the frequency of other wireless network circuits within the base station is of paramount concern, the use of channels by other base stations in the environment is a consideration as well. Ideally, channels are chosen that do not conflict with the channels being used by other base stations in the environment, as well as ensuring that signals from each of the wireless network circuits do not overload other receivers in the base station.

The availability of a channel may be determined in a number of ways. In one method, the receiver is activated, and the signal strength and frequency of signal reception for one or more channels is evaluated. Channels that have strong or frequent signals present are considered to be occupied and not available. In another method, sample transmissions can be sent while monitoring the effect on other receivers within the base station. If the transmissions can be sensed at the other receivers, or if the transmissions disrupt the communications of the other receivers, that channel is considered occupied and not available. Finally, if the transmitter being activated has an intended receiver at a remote location, the reliability and quality of the communications link can be sensed. If communication is poor or sporadic, it may be possible to conclude that the frequency channel chosen is occupied and should not be considered available.

In another aspect of the invention, method 300 may utilize a look-up table stored in memory 110 that establishes the frequency range of operation for each wireless network circuit 102A-N. For example, the table may specify that one of the wireless network circuit 102A-N be configured to channel one, while another of the wireless network circuits 102A-N is configured to channel two, and so forth.

At 306, if all of the frequency channels are available method 300 proceeds to 308. At 308, method 300 configures each of the wireless network circuits 102A-N to a separate frequency channel and proceeds to 316 end described below. In one aspect, one RF filter circuit 122A-N for each wireless network circuit 102A-N is selected corresponding to a respective frequency channel allocation. The frequency channel allocation may be random or specified. For example, to balance frequency channel usage and minimize interference, method 300 may configure each of the wireless network circuits 102A-N so that the frequency channels of operation are spread about evenly across the available frequency channels. For example, method 300 may configure for ten frequency channels and five wireless network circuits 102A-N, the five wireless network circuits 102A-N being configured to use all odd frequency channels (i.e., frequency channels one, three, five, seven, nine). To minimize interference and cross talk, method 300 may increase the channel spacing between adjacent receiving and transmitting wireless network circuits 102A-N. For example, if a very strong RF signal is being transmitted on channel one from a transmitting wireless network circuit 102A-N adjacent a wireless network circuit 102A-N that is trying to receive a very weak signal, method 300 may increase the channel separation between them. Illustratively, method 300 may configure the receiving wireless network circuit 102A-N to a channel spaced further away in frequency from the transmitting wireless network circuit 102A-N, such as channel ten. If at 306, not all frequency channels are available, method 300 proceeds to 310.

In another embodiment, method 300 may increase a physical distance separating transmitting and receiving wireless network circuit cards. For example, controller 108 is configured to assign which communication channels (e.g. frequencies) are utilized by the wireless network circuit cards 102A-102N. That is, a communication on a particular assigned channel may be performed by any one of the cards 102A-102N as assigned by the controller. The controller assigns and/or dynamically re-assigns communication channels handled by the network circuit cards based on a formula and/or criteria. For example, the controller (e.g., wireless device configuration program 114) utilizes information such as a slot number in the system 100, information as to the location of the slot, the direction in which any directional antenna is transmitting, and strength of incoming and transmitted signals. Then, channel assignments are, for example, made such that the network circuit card having the strongest transmitted signal is physically as far away as possible from the network circuit card with the weakest received signal. Similarly, cards with antennas that are located close to each other can use widely separated channel frequencies, while cards with antennas that are far from each other may use smaller channel frequency spacing.

At 310, method 300 determines if at least one frequency channel is available. If at least one frequency channel is not available, then method 300 returns to step 304. If however at least one frequency channel is available, method 300 proceeds to 312. At 312, method 300 determines which frequency channels to allocate for each of the wireless network circuits 102A-N. In one aspect, available frequency channels are allocated by examining the unused frequency channels and by determining the number of the wireless network circuits 102A-N being used. As described above, frequency channels may be allocated randomly or in a specified order. For example, for a ten-channel system having three wireless network circuits 102A-N, the method 300 may allocate the frequency channels for the three wireless network circuits 102A-N randomly. Method 300 may specify a specific order such as frequency channels one, two, and three. Method 300 may also separate the frequency channel usage by specifying frequency channels further apart such as frequency channels one, five, and ten. Again, the allocation may also take into consideration existing and/or anticipated traffic on neighboring networks.

At 314, method 300 configures each wireless network circuit 102A-N for a respective channel allocation and ends at 316. In one aspect, a RF filter circuit 122A-N having a passband corresponding to such a respective channel allocation is selected for each of the wireless network circuits 102A-N. For example, if a wireless network circuit 102A-N is specified to operate on channel two, a RF filter circuit 122A-N corresponding to the channel two wireless network circuit is configured to have a frequency passband for the frequency of channel two.

In one aspect, the wireless network circuits 102A-N may be dynamically reconfigured as needed. For example, if one wireless network circuit 102A-N is not being used, its frequency channel of operation may be used by another wireless network circuit 102A-N. When an unused wireless network circuit 102A-N is then needed, it may be reconfigured to another available frequency channel. Further, the wireless network circuits 102A-N may be dynamically configured to adjust for dynamic frequency channel usage. Illustratively, wireless network circuits 102A-N may be dynamically configured to different frequency channels when receiving signals than when transmitting signals.

In yet another embodiment, if a wireless network circuit card begins transmitting relatively high power signals and is physically close to a wireless network circuit receiving weak signals, then the channels can be reallocated to such that the high power transmitting and weak signal receiving wireless network circuits are physically separated by as much physical distance as possible.

Referring back to the previous discussion regarding co-located devices, there are a number of wireless networks that use random access protocols. These protocols allow any device to begin transmitting at any time. Many employ a listen before talk protocol to avoid collisions within the same channel. However, this mechanism does not prevent co-located devices operating on different radio channels or frequencies from beginning to transmit while another co-located device is receiving. Collision Sense Multiple Access (CSMA) and Distributed Control Function (DCF) are two common random access protocols. In particular, 802.11 wireless networking devices utilize DCF, and are therefore random access devices. The techniques described herein are particularly valuable for such devices since there is not a mechanism within the DCF protocol to coordinate the timing of transmissions from individual devices in the network.

While the foregoing is directed to embodiments of the present invention, other and further embodiments of the invention may be devised without departing from the basic scope thereof, and the scope thereof is determined by the claims that follow.

The invention claimed is:

1. An RF device comprising:
    a receiver configured to utilize a random access communications protocol, the receiver being implemented on a radio card having a slot number and a slot location;
    a channel detector configured to determine an available frequency from a plurality of frequencies;
    a filter circuit including a plurality of filters, each filter being associated with at least one frequency of the plurality of frequencies, and each filter having a different frequency passband than other filters of the plurality of filters; and
    a controller configured to set the filter circuit to pass the available frequency via a selected filter based on at least one of the slot number and the slot location.

2. The RF device according to claim 1, wherein the device utilizes the 802.11 protocol.

3. The RF device according to claim 1, wherein the filter circuit includes at least one passband filter that passes the available frequency.

4. The RF device according to claim 3, wherein the passband filter passes a band of 802.11 regulated frequencies.

5. The RF device according to claim 1, wherein the filter circuit comprises a filter module detachably coupled to the receiver.

6. The RF device of claim 1, wherein each filter has a different passband.

7. The RF device of claim 1, wherein each filter passes a different frequency/passband.

8. The RF device of claim 1, wherein the filter circuit is configurable to switch between sets of the plurality of filters.

9. The RF device of claim 1, further comprising a transmitter, wherein the RF device is configured for simultaneous transmission and reception.

10. The RF device of claim 1, wherein the random access protocol is one of CSMA and DCF.

* * * * *